July 5, 1966   H. WARNKE   3,259,368
APPARATUS FOR EFFECTING RELATIVE VERTICAL DISPLACEMENT
BETWEEN A MOVABLE PLATFORM AND VERTICALLY
ORIENTED SUPPORTS THEREFOR
Filed Feb. 20, 1964   6 Sheets-Sheet 1

INVENTOR.
HELMUTH WARNKE

BY *[signature]*

ATTORNEYS

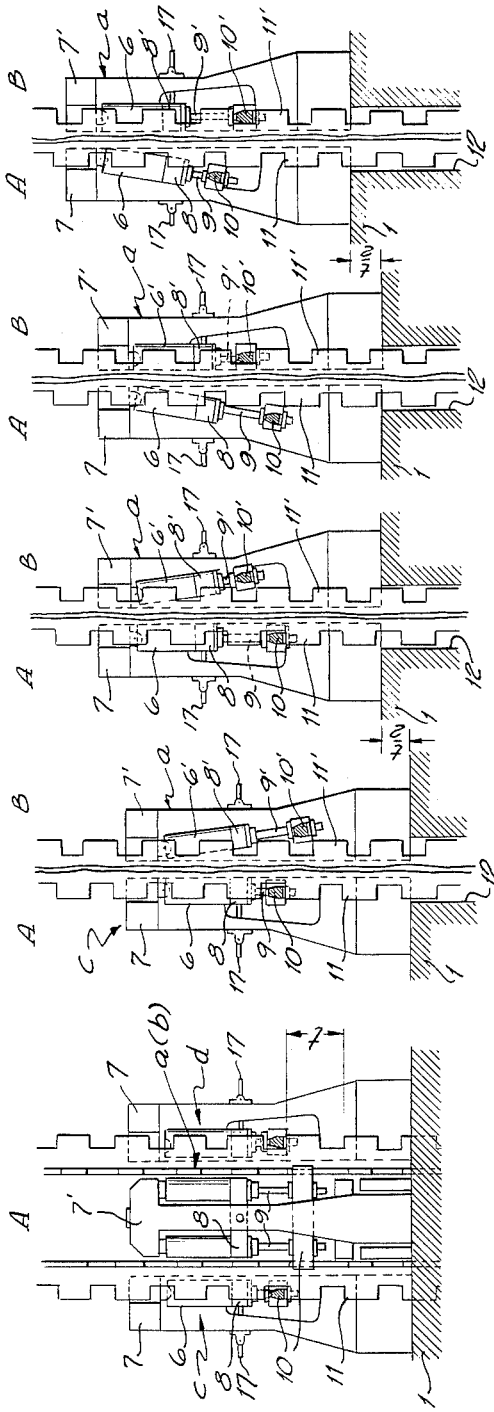

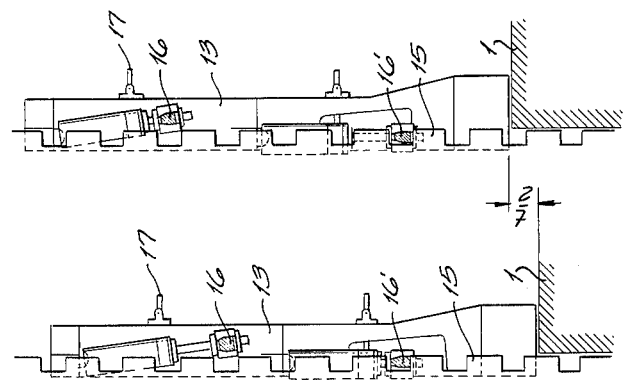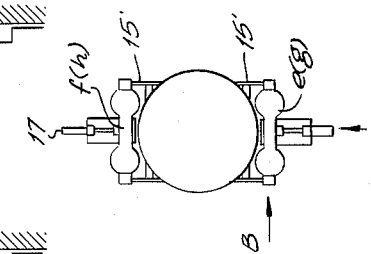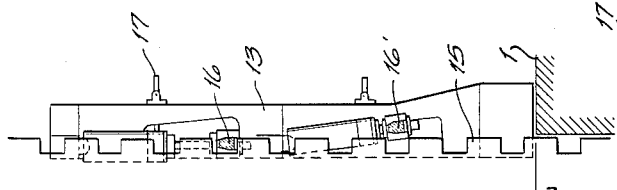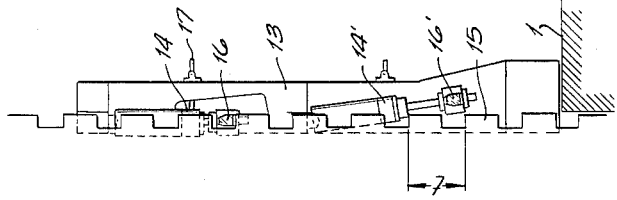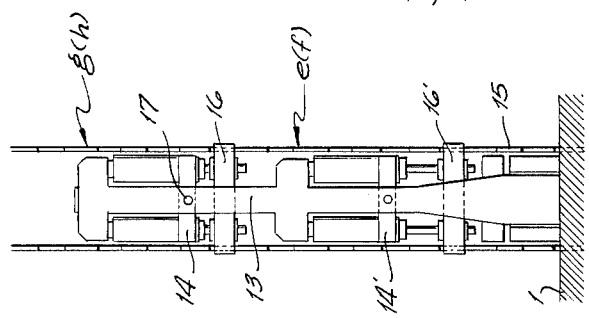

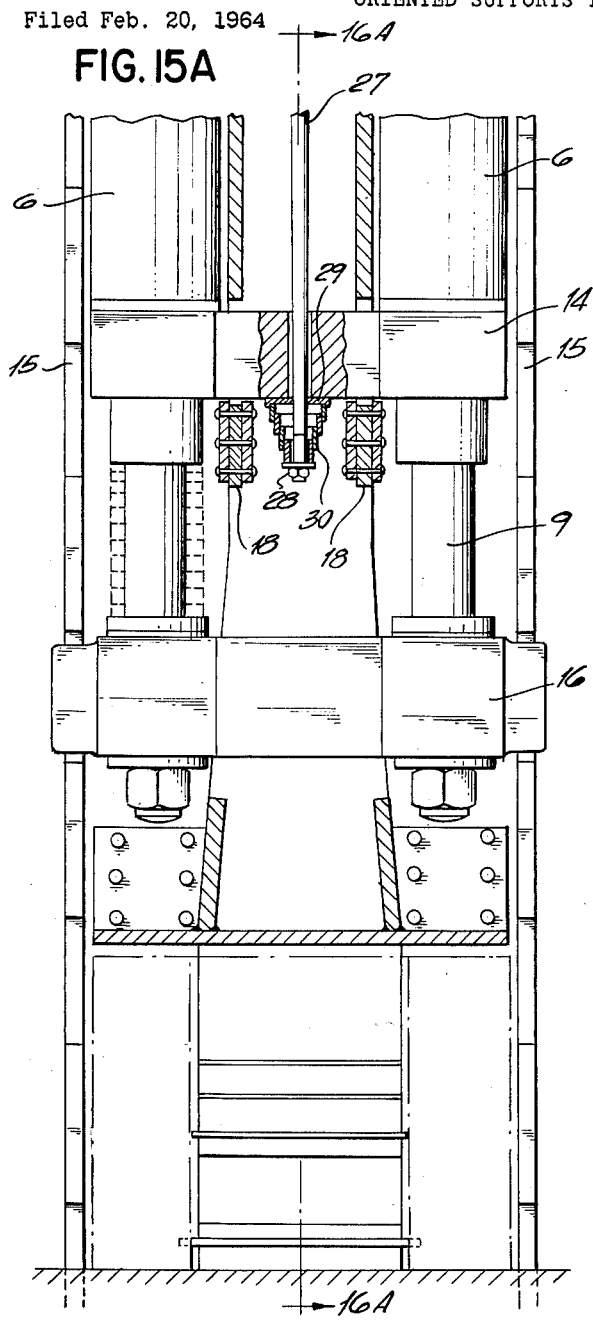
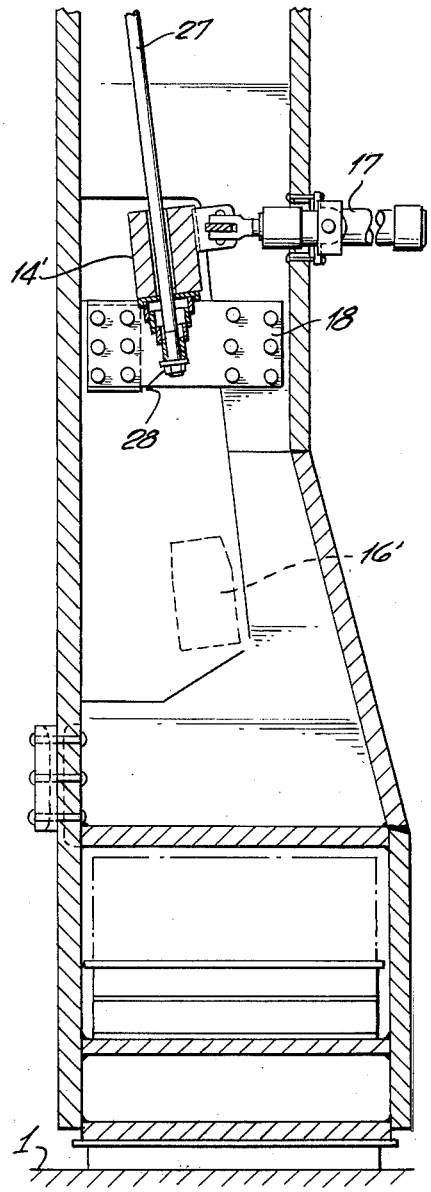

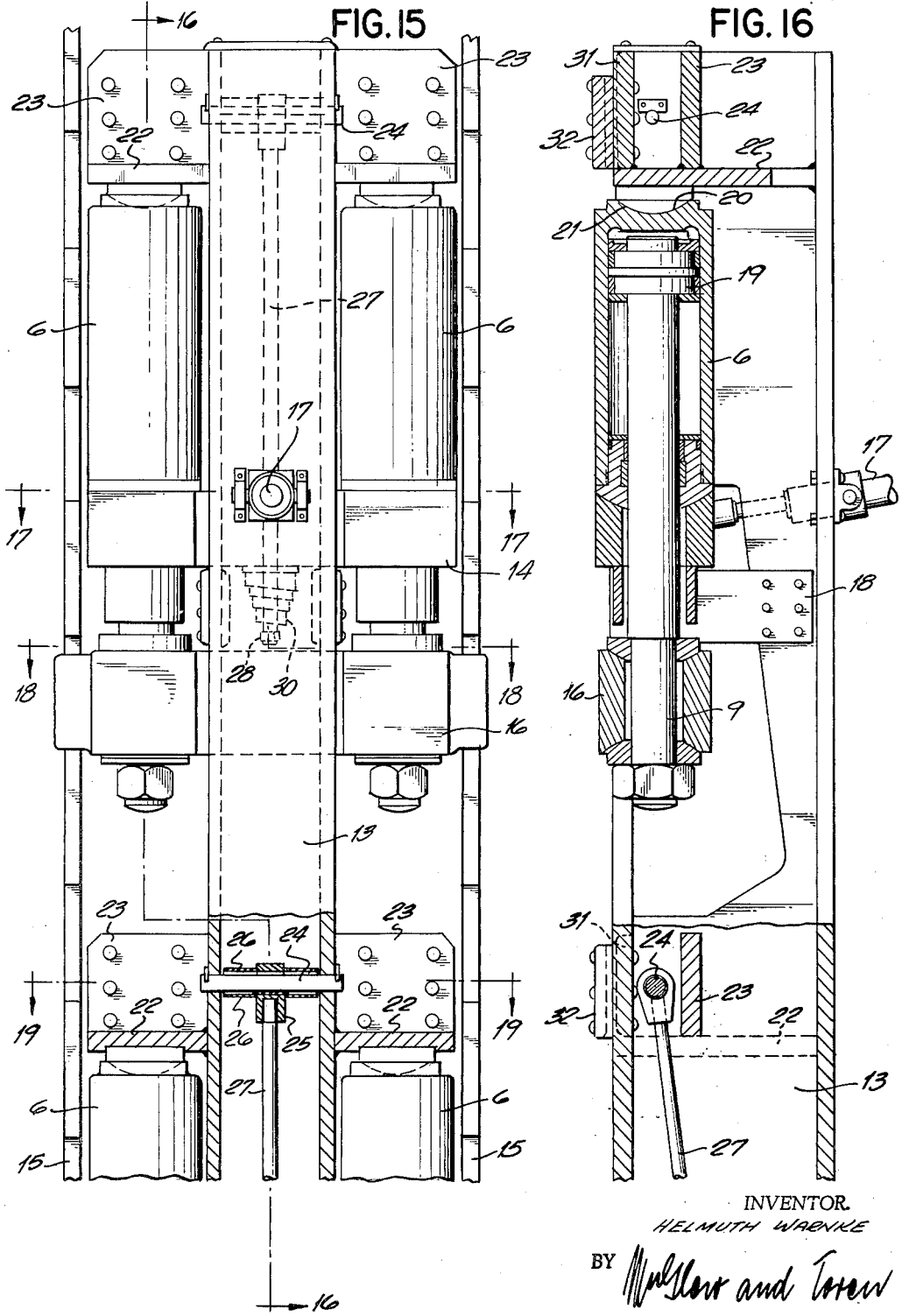

July 5, 1966
H. WARNKE
3,259,368
APPARATUS FOR EFFECTING RELATIVE VERTICAL DISPLACEMENT
BETWEEN A MOVABLE PLATFORM AND VERTICALLY
ORIENTED SUPPORTS THEREFOR
Filed Feb. 20, 1964
6 Sheets-Sheet 6
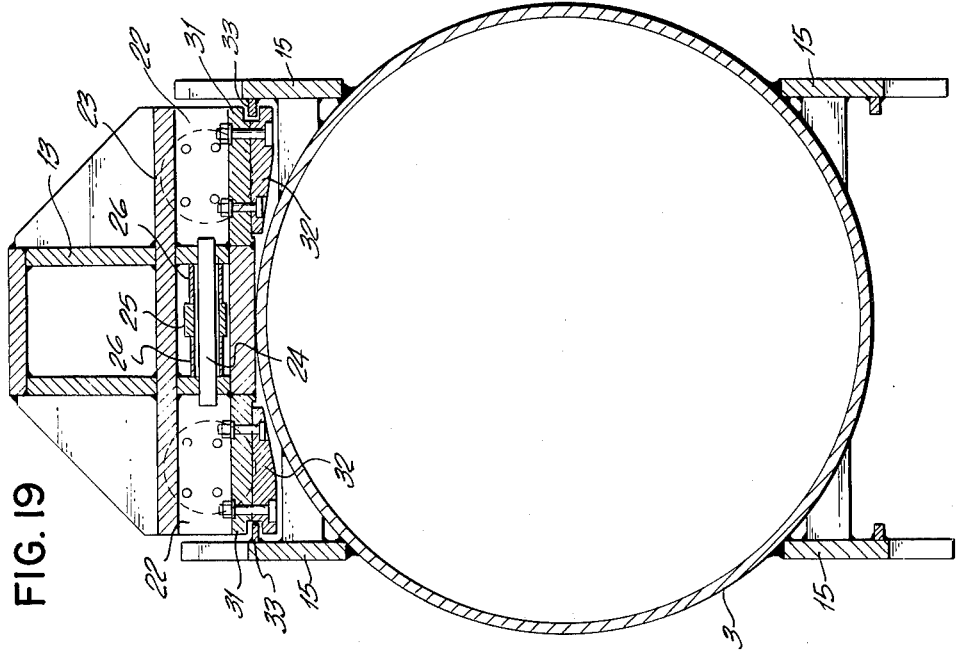
FIG. 19
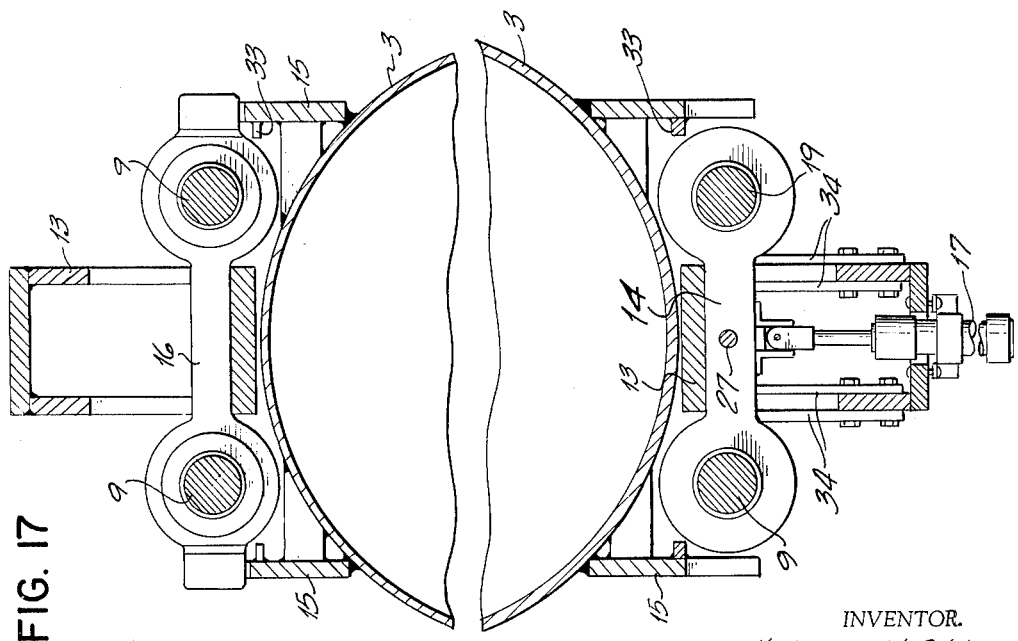
FIG. 17
FIG. 18
INVENTOR.
HELMUTH WARNKE
BY *[signature]*
ATTORNEYS

United States Patent Office 3,259,368
Patented July 5, 1966

3,259,368
APPARATUS FOR EFFECTING RELATIVE VERTICAL DISPLACEMENT BETWEEN A MOVABLE PLATFORM AND VERTICALLY ORIENTED SUPPORTS THEREFOR
Helmuth Warnke, Oberhausen-Sterkrade, Germany, assignor to Gutehoffnungshutte Sterkrade Aktiengesellschaft, Oberhausen-Sterkrade, Germany
Filed Feb. 20, 1964, Ser. No. 346,337
Claims priority, application Germany, Feb. 23, 1963, G 37,134
7 Claims. (Cl. 254—110)

This invention relates to floating or buoyant platforms such as used, for example, for supporting oil drilling equipment, and which are usually provided with vertically oriented supports which may be lowered into contact with the bed of stream or of the sea and raised when it is desired to move the platform to another position or location. More particularly, the present invention is directed to novel apparatus for effecting relative vertical displacement of a movable working platform and vertically oriented supports therefor.

As stated, floating or buoyant platforms have been used for supporting equipment at off-shore locations, such as in rivers, harbors, bays and even in the open sea. These floating platforms are usually provided with several vertical supports which are retracted upwardly when the floating platform is moved from one location to another and which are lowered into platform supporting contact with the bed of the stream or of the sea when the floating platform is at the desired working location.

The supports for these platforms usually have a hollow cross section, such as a circular or polygonal cross section, and the supports are arranged for vertical displacement relative to the floating working platform proper. Irrespective of the particular form and construction of such supports, the chief problems confronting the art have been the type and arrangement of the jacking or stroking means for lifting and lowering such supports relative to the associated floating platform.

The force necessary to hold the platform in adjusted position, or to lift the platform, can be transmitted either by pure clamping connections, which involve the rigid engagement of the supports by lateral pressure, or such forces may be transmitted by opposing interengagement of constructional elements. Such latter arrangement may be effected in various manners. As distinguished from a pure clamping connection, the latter type of support, even with heavy loads, is not dependent upon large frictional forces derived from correspondingly large horizontal forces, but is dependent upon vertically oriented forces.

In a known arragement of this kind, the wall of each support is formed with several superposed rows of openings arranged in vertically spaced relation therealong, with the openings of each row being distributed uniformly around the periphery of the support. Bolts are arranged to realeasably engage in these openings to support the platform, and may be retracted for relative vertical adjustment of the supports and the platform. It has further been suggested to replace the bolts and the apertures by securing ledges to the outside of the support, these ledges being formed with teeth or with step-like formations, thus constituting rack means. The ledges are then used as a vertical bearing surfaces for latches or similar locking means for securing the platform in adjusted position along its supports.

All known arrangements for lifting and lowering floating platforms and the like relative to their associated vertically extending support operate on what may be termed the "climbing rod principle." In such arrangements, there are two vertically spaced groups of clamping or latching elements, and these clamping or latching elements may be actuated hydraulically or pneumatically by pressure cylinders or the like. The groups are actuated in alternation to be extended and to be retracted, and thereby a step by step "climbing" of the support is effected. In each case, only one group at any one time is connected with the associated vertically extending support.

In such known arrangements, there is always an intermittent or step by step stroking or lifting procedure. Thus, one group of the clamping or latching elements is operated to effect a connection between the platform and its supports for lifting or lowering the platform relative to the supports, while the other group serves merely for temporary supporting engagement between the platform and its supports.

Arrangements have also been proposed in which the lifting or lowering is effected by rack and pinion arrangements. However, these arrangements have the disadvantage that excessively high gear teeth pressures are involved, even if the forces transmitted are distributed over several pinions. Due to the high gear teeth pressures involved, and due to the high powered transmission systems required, the power transmission system is large and bulky, resulting in difficulty in attaining a uniform distribution of the forces during raising and lowering of the platform.

In addition to the arrangements just described, other arrangements have been proposed in which at all times at least one pair of stroking or jacking means is in engagement with an associated support and is performing a working stroke, while a second pair of stroking or jacking means, which is offset circumferentially or vertically of the support relative to the first pair of stroke or jacking means, performs an idling stroke in preparation for the next working stroke. Arrangements of this type have been proposed to expedite the lifting or lowering operation, because all of the jacking or stroking units are arranged to perform both working strokes and idling strokes, and thus to contribute to the lifting or lowering of the platform relative to the supports. Thereby, the idle periods which are unavoidable in the previously mentioned arrangements, are substantially reduced because idling strokes are performed by some elements while other elements are performing working strokes. Nevertheless, this prior art arrangement does not provide a full soltuion for the problem because there are still time lags so that no truly continuous and uninterrupted lifting or lowering of the platform can be effected.

An object of the present invention is to provide a novel appartus of the mentioned type but which is free of the disadvantages of the prior art while utilizing known types of stroking or jacking means which are swingably or oscillatably mounted.

In prior art arrangements involving swingable or oscillatable stroking or jacking means, there are notable disadvantages. Not only are there interruptions in the lifting operation, but there are other disadvantages. For example, in known arrangements respective stroking or jacking means have their lower or cylinder ends oscillatably connected with an element which is rigidly secured to the working platform, while the upper or free end of an associated piston rod is engaged with teeth of racks formed along the vertically oriented supports. In this particular known arrangement during lifting of the working platform relative to its supports and when the greater effort has to be exerted, the fluid working medium under positive pressure must be applied against the upper surfaces of the pistons. With the piston rods extending vertically, the effective areas of the upper surfaces of the pistons are reduced by the cross sectional areas of the piston rods. Thus, a much higher unit pressure of the working medium must be used in order to achieve the same total pressure.

The same disadvantage applies to lowering of the working platform. The working medium, under a positive pressure, is applied to the lower surfaces of the pistons, and these surfaces are unobstructed by the piston rods. This application of positive pressure to the lower surfaces of the pistons takes place when the supports are to be displaced relative to the working platform. Such lifting or lowering of the supports relative to the working platform requires much less effort than is required for lifting or lowering of the platform itself relative to its supports. Consequently, a higher unit pressure of the working medium is necessary for lifting or lowering the working platform relative to its support, while only a much lower unit pressure of the working medium is necessary when lifting or lowering the supports relative to the working platform. In other words, when the greater effort is required, the then effective working area of the piston surface is less and, when the smaller effort is required, the effective working area of the piston surface is at its maximum. This is contrary to good engineering technique and results in a poor efficiency.

In accordance with the present invention, this disadvantage is overcome by so arranging the hydraulic or pneumatic actuator units that the upper ends or free ends of the cylinders are oscillatably connected to a frame element or the like which is fixedly secured to the working platform. The lower or extendable ends of the actuators, namely the ends of the piston rods secured to the double acting pistons within the cylinders, are arranged to have operative engagement with teeth of lock means or the like. Thereby, during lifting or lowering of the platform relative to its supports, the completely clear upper area of the piston is available for application of the pressure medium, and thus a much lower unit pressure may be used to achieve the same total pressure. Conversely, when the supports are being raised or lowered relative to the platform, where a great deal of less effort is required, the pressure medium is applied to the lower surfaces of the pistons, which lower surfaces are reduced in area, relative to the upper surfaces, by the cross sectional area of the piston rods. However, in this instance, the same unit pressure may be used as is used during lifting or lowering of the platform relative to its supports, and the total pressure effect is less than is required when lifting or lowering the platform.

In accordance with the invention, each stroking or jacking means comprises two cylinders having their free ends supported, adjacent each other, on a frame component fixedly secured with the working platform, the supports being arranged to provide for oscillation of the jacking or stroking means. Double acting pistons are provided for the two cylinders, and two cross beams or girders are also provided. One of these cross beams or girders interconnects the lower ends of the piston rods, which latter extend downwardly from the cylinders in the manner of supporting feet. The other girder or cross beam interconnects the cylinders at their lower ends and holds the cylinders with their upper ends engaged with the associated frame component. This is effected by means of a tension bolt which is connected with the second mentioned cross beam or girder by means of a resilient biasing means, the biasing means acting in a direction to move the second mentioned girder or cross beam upwardly, and thus move the two cylinders upwardly to maintain the upper ends of the cylinders firmly engaged with the frame component or the like connected to the platform.

A further feature of the invention is the provision of additional cross ledges or the like on the frame components, and the purpose of these additional cross ledges is to engage the cross beam interconnecting the cylinders during application of pressure to the lower surfaces of the pistons for lifting or lowering of the supports relative to the working platform.

An advantageous feature of the invention is the arrangement of the cylinder suspension points, with respect to rack means extending along the supports, in such a manner that the jacking or stroking means are vertically oriented in their operative positions or during their working strokes. Thus, the jacking or stroking means can effect the working stroke with the highest possible efficiency. By contrast, in known prior art arrangements, the jacking or stroking means, in the working positions, are inclined from a vertical orientation. As a result, there is a horizontal component of the force exerted on the piston, and this horizontal component is ineffective and therefore wasted.

With the invention arrangement, the small time interruptions which inadvertently occur with prior art arrangements, are completely avoided. This is done by arranging the recesses or notches of the rack means to have an essentially rectangular configuration in elevation, with a clear height between the upper edge of one rack tooth and the lower edge of the next upper rack tooth being preferably somewhat larger than the vertical dimension of the cross beam interconnecting the piston rods of the stroking or jacking means.

As still a further feature of the present invention, each stroking or jacking means may be associated with a respective rack means. The rack means of the two groups are offset transversely relative to each other and offset vertically by a distance equal to substantially one half the pitch of rack teeth. However, this arrangement may be modified by providing a single rack associated with both stroking or jacking units, with the stroking or jacking units being superimposed on the same frame or support.

Each complete cycle of the jacking or stroking units involves one working movement, two oscillatory movements, and one idling movement. These oscillatory movements are controlled by suitable means, which preferably are of a hydraulically actuated nature.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 3 is a side elevation view of the jacking units associated with one of the vertically oriented supports;

FIG. 4 is a plan view corresponding to FIG. 3 and illustrating that embodiment of the invention in which the jacking means are arranged in opposing relation and in pairs, with the pairs offset angularly relative to each other in a horizontal plane;

FIGS. 5–8 are fragmentary elevation views of the arrangement shown in FIGS. 3 and 4, with the left hand portion of each of FIGS. 5–8 being taken looking in the direction of arrow A of FIG. 4 and the right hand portions of each of FIGS. 5 to 8 being taken looking in the direction of arrow B in FIG. 4;

FIGS. 9 and 10 are views, corresponding respectively to FIGS. 3 and 4, of another embodiment of the invention;

FIGS. 11–14 are fragmentary side elevation views of the embodiment of the invention shown in FIGS. 9 and 10, and taken looking in the direction of the arrow B of FIG. 10, these figures illustrating successive steps during a raising of the platform relative to its vertically oriented supports;

FIG. 15 is a side elevation view, partly in section and to an enlarged scale, of the arrangement shown in FIGS. 9–14;

FIG. 16 is a vertiual sectional view taken on the line A–B of FIG. 15;

FIG. 17 is a transverse sectional view, with the upper half being taken on the line C–D of FIG. 15 and the lower half being taken on the line G–H of FIG. 15; and FIG. 18 is a transverse sectional view taken on the line E–F of FIG. 15.

Figure 1:
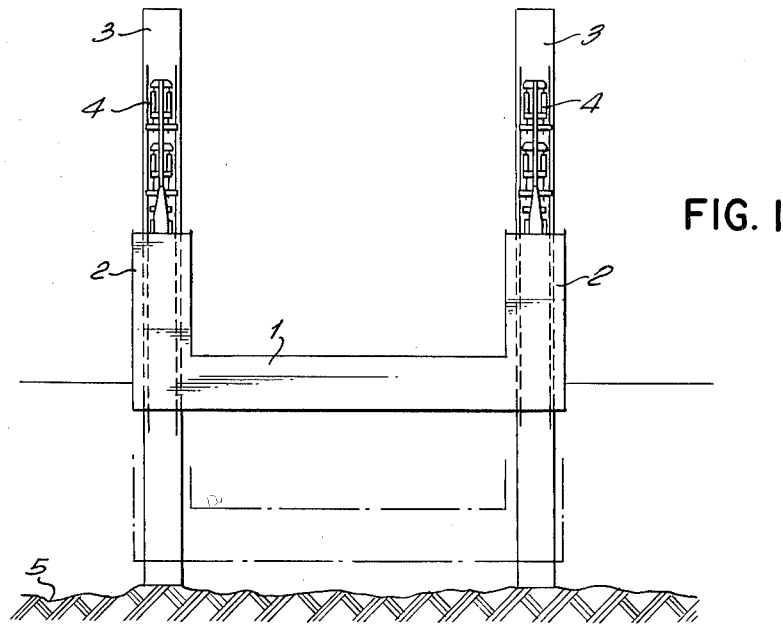
FIG. 1 is an end elevation view of a floating platform and its supports, embodying the present invention, the platform being illustrated as one useful for lifting a ship and as having four vertically oriented supports.
Figure 2:
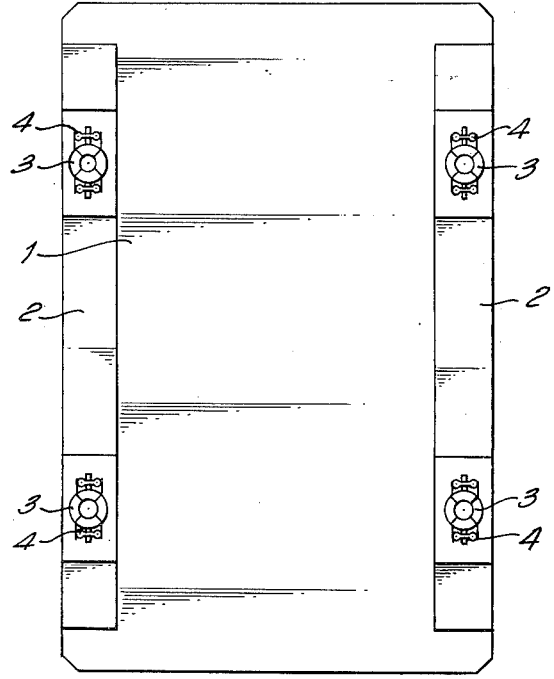
FIG. 2 is a top plan view of the platform shown in FIG. 1.

Referring to FIGS. 1 and 2, a floating platform 1 is therein illustrated as arranged as a ship lifting platform, vertically displaceable dry dock, or the like. Platform 1 has a substantially rectangular and horizontally extending base formed with upwardly extending, preferably hollow, side walls 2 along its longer sides. Each side wall 2 has extending vertically therethrough pipe-shaped or tubular supports 3 which are vertically displaceable relative to plafrom 1 by means of jacking or stroking means 4, which are preferably hydraulic actuator sets. When supports 3 have their lower ends engaged in the bed 5 of the ocean or the like, platform 1 can be lifted, relative to supports 3, to a position above the water level for performing operations on a docked or anchored ship. However, platform 1 also can be lowered to a submerged position shown in dot and dash lines. In this position, the platform can be used to lift a ship or the like which is floating in the water. Raising and lowering of platform 1 can be effected by the stroke units 4 in the event that the usual dry dock arrangements for pumping or flooding out compartments are not provided.

FIGS. 3 and 4 illustrate the construction and arrangement of the four jacking or stroking means $a$, $b$, $c$ and $d$ associated with one support 3. Each of such jacking or stroking means comprises a pair of cylinders 6 which are oscillatably mounted at their upper ends at the same horizontal position, on an upper cross head of a frame 7 secured rigidly to platform 1. Cylinders 6 are secured together to operate as a unit by means of a girder or cross beam 8 connecting the lower ends of cylinders 6. Cross beam or girder 8 is connected to the frame 7 by a bolt and spring means described more particularly in connection with FIGS. 15–18.

Double acting pistons are provided in each of the cylinders 6, and each of these pistons has a piston rod 9 extending downwardly from the associated cylinder 6. The piston rods 9 of a pair of cylinders 6 are interconnected, at their lower ends, by means of a girder or cross beam type of supporting foot 10. The supporting feet 10 are arranged to operatively engage the teeth or ledges 11 of rack means arranged in pairs to extend laterally from supports 3 and running longitudinally of the supports, the rack means extending through suitable apertures 12 in platform 1. The lateral spacing between each pair of rack means 11 is somewhat greater than the lateral extent of the associated pair of cylinders 6.

In the embodiment of FIGS. 3 and 4, the four jacking or stroking means are offset horizontally relative to each other, as by being positioned at 90° intervals around support 3. Thus, they are arranged in two pairs with unit $a$ being diametrically opposite unit $b$ and unit $c$ being diametrically opposite unit $d$. The two units of each pair operate in synchronism with each other, but the operation of each pair is offset or staggered in alternation relative to the operation of the other pair of units. This procedure is best illustrated in FIGS. 5–8.

Each of FIGS. 5–8 illustrates a pair of units which are offset horizontally from each other by 90°, the unit to the left of each of FIGS. 5–8 being that viewed in the direction of arrow A of FIG. 4, and the unit to the right of each of FIGS. 5–8 being that viewed in the direction of the arrow B of FIG. 4. In order to differentiate between the individual parts of the two units, those parts of the unit illustrated to the right of FIGS. 5–8 have been given the same reference characters primed as those parts illustrated to the left of each of FIGS. 5–8.

In the position illustrated in FIG. 5, foot 10 of the left hand unit is in platform supporting engagement with a ledge of its associated rack means 11, and thus supports platform 1 relative to this rack which is secured to a support 3 and extends through recess 12 in platform 1. The foot 10' of the right hand unit is illustrated as swung outwardly out of engagement with a ledge of its associated rack means 11', and such swinging is possible after the piston rods 9 associated with the cylinders 6 have been extended an amount sufficient to lift foot 10' off its associated ledge of rack 11'. It should be noted that the steps of rack 11' are offset by one half a division ($t/2$) relative to the steps of the rack 11, with $t$ being the "pitch" of the rack means.

The working medium under positive pressure is admitted to the upper end of cylinder 6 above the piston therein to force the piston and its associated rod 9 downwardly thereby to lift cross head 7 and platform 1 relative to support 3 and rack means 11. At the same time, fluid is exhausted from beneath the cylinder of piston 10. The amount of each lifting increment or stroke amounts to about one half the step of the rack ledges, or substantially the distance $t/2$. Simultaneously, fluid under pressure is admitted beneath the piston in cylinder 6' to retract piston rod 9 and associated foot 10', the degree of such retraction being equal to substantially the working stroke of the cylinder 6'. Of course, pressure medium is exhausted from above the double acting piston in the cylinder 6' during such retracting operation. The retracted position of the right hand unit is illustrated in FIG. 6.

Referring to FIG. 7, the right hand unit is then swung inwardly so that its foot 10' will be slightly above a ledge of the rack 11', and can be extended into engagement with this ledge. Pressure is now admitted above the piston of cylinder 6' to extend foot 10' into platform supporting engagement with the associated ledge of rack means 11'. At the same time, fully extended foot 10 of the left hand unit is raised slightly out of engagement with the then engaged ledge of its associated rack means 11, so that the left hand unit may be oscillated in a clockwise direction.

Admission of fluid medium under pressure above the piston of the cylinder 6' continues, and the pressure fluid medium is simultaneously admitted under pressure beneath the piston of the unit 6. Therefore, the piston of cylinder 6' is advanced so that the platform 1 continues its lifting movement without interruption, while the piston of unit 6 is retracted to move its foot 10 to the position shown in FIG. 8. Before the piston in the unit 6' has completed its working stroke, the left hand unit is swung from the position of FIG. 8, and extended in a working stroke to engage its foot 10 with a ledge of its associated rack 11, this movement being continued to lift fully extended foot 10' out of engagement with the step of its associated rack 11' and to provide an uninterrupted continuing lifting movement of the platform 1. The cycle is then repeated.

FIGS. 9 and 10 show a modification of the arrangement or positioning of the stroking or jacking means, which are identical, in detailed construction and operation, with those shown in FIGS. 3 and 4. In the arrangement shown in FIGS. 9 and 10, the four jacking means are arranged in pairs such as $e$ and $f$, and $g$ and $h$. The two units, such as $e$ and $f$, of each pair are arranged in diametrically opposed relation. The pair of units $e$–$f$ is disposed at a different level from the pair of units $g$ to $h$, the units $g$–$h$ being illustrated as above the units $e$–$f$. All four units are secured to a common frame member 13 which is fixedly connected to platform 1. The particular mounting of the units is best illustrated in FIGS. 13–18 described hereinafter. Racks 15, 15' which extend along and are secured to the external surface of the support 3 are cooperable with the four units, and it should be noted that, as distinct from the arrangement shown in FIGS. 3 and 4, the racks are not offset longitudinally relative to each other. The lower ends of the two cylinders forming each unit are again interconnected by a cross beam 14, and the lower ends of the piston rods of each pair are interconnected by a cross beam 16.

FIGS. 11–14 illustrate the operation of the arrangement shown in FIGS. 9 and 10, with the respective FIGS. 11 to 14 being partial elevation views taken in the direction of the arrow B of FIG. 10. In the position of the parts shown in FIG. 11, foot 16 of the upper unit is shown as being in engagement with a ledge of rack 15 and somewhat extended so as to lift frame 13 and platform 1 sufficiently that foot 16', which is already fully extended, has clearance with a ledge of the rack 15. Thus, the lower unit can be oscillated outwardly, or counterclockwise as viewed in FIG. 11, and then retracted as viewed in FIG. 12 during the time that the upper unit performs its working stroke to lift platform 1. As the upper unit nears the limit of its working stroke, the retracted lower unit is swung back to engage its foot 16' with a ledge of rack 15 and is extended. Thus, as foot 16' is being extended, foot 16 reaches its limit of retraction and clears its associated ledge of rack 15 so that the upper unit may be swung counterclockwise to the position of FIG. 13. The upper unit is then retracted to the position of FIG. 14 during the uninterrupted continuation of the lifting of platform 1 by the working stroke of the lower unit.

It should be noted that, while FIGS. 11–14 show only one unit of the upper and lower pairs, both units associated with each pair operate in synchronism with each other. Thus, there is always a balance of the lifting forces with respect to the column or support 3, and it should be noted further that, in all of the arrangements illustrated in FIGS. 3–10, when a unit is in its working position it extends parallel to the axis of the associated support 3 so that there is no wasted horizontal component of the force exerted by a unit.

Inward and outward oscillation of the respective units is effected by hydraulic actuators 17, which are secured to frames 7, 7' and 13, and have their active ends connected to the cross beams such as 8, 8', 14 or 14'. The control of the actuators 17 is effected independently of the working and idling strokes of the respective jacking means or stroke means.

The detailed construction and mounting of the stroking or jacking units is best illustrated in FIGS. 15 through 18. Referring to these figures, each cylinder 6 has a double acting piston 19 therein connected to the upper end of piston rod 9. The upper end of each cylinder 6 is formed with a spherically concave bearing surface 20, which is in mating engagement with a spherically convex bearing surface 21 affixed to the lower surface of a plate 22 extending horizontally from frame member 13 and braced by a vertical plate 23 secured to extend outwardly from a side wall of frame member 13. The cylinders 6 are oscillatable by virtue of the mating curvatures of concave surface 20 and convex surface 21.

A pin 24 extends horizontally between the side walls of frame element 13 at substantially the center of the surfaces 20 and 21, and a yoke 25 is pivotal on each pin 24, being held in centered relation thereon by spacer sleeves 26. Each yoke 25 has the upper end of a rod 27 secured therein, and rod 27 extends downwardly and through a substantially central aperture in cross beams 14 or 14'. A strip-type coil spring 30 embraces the projecting lower end of each rod 27 and is seated against a bearing plate 29 on the lower surface of beam 14 or 14' and held thereagainst by a nut 28 screwed on the end of rod 27. By the described means, the upper ends and concave surfaces 20 of cylinders 6 are continuously biased into firm engagement with convex surfaces 21 associated with frame 13.

To maintain parallelism between racks 15 and frame members 13 during relative movements of the racks, the supports, and platform 1, a pair of plates 31 are secured to extend from opposite sides of the front face of frame member 13 at about the level of pins 24. Plates 32 are secured in juxtaposed relation to plates 31 by suitable bolt and nut means, and plates 31 and 32 are formed to conjointly provide a groove receiving a rail 33 extending longitudinally of the inner surface of each rack 15.

Actuators 17 are mounted on the outer walls of frame members 13 so as to be swingable about a horizontal pivot, and these actuators project through apertures in such outer wall and have their pistons connected by a universal-type of joint to cross beams 14, 14'. For a purpose to be described, ledges 18 extend transversely of each frame member 13 at a distance somewhat below the associated hydraulic actuators 17.

In lowering platform 1 relative to supports 3, the procedure is the reverse of that described in connection with FIGS. 5–8 and 11–14. In advance of lowering of platform 1, one of the units 4 will be fully extended with its foot 14 or 16 engaged with a step of the rack. The pressure medium then in the upper ends of cylinder 6 above pistons 19 is allowed to flow out in a throttled manner to permit slow speed lowering of pistons 19 through cylinders 6. Meanwhile, the then retracted unit 4 will have its piston 19 and piston rod 9 extended and moved into substantially vertical orientation so as to engage a step of rack means 15 after a predetermined retraction of the previously extended unit 4. Just in advance of full retraction of the previously extended unit 4, the foot 16 of the now extended unit engages with a step of rack means 15 and throttled exhaust of the pressure medium above the associated pistons 19 is performed for this cylinder also. The cycle is repeated until platform 1 has been lowered the desired amount relative to its supports 3.

The raising or lowering of supports 3 relative to platform 1 is effected in the following manner. With one set of units 4 swung out of engagement with the associated rack means, as in the position of FIGS. 11 and 12 which illustrate the lower units thus swung out, the pressure medium which is operative upon the under surface of pistons 19 of cylinder 6 connected to cross beam 16 is exhausted in a throttled manner, or as a braking stroke, to lower racks 15, and thus supports 3, relative to platform 1. During such lowering, beams 14, 14' or 8 remain in engagement with ledges 18 so that the racks and their attached supports 3 are now suspended from platform 1 and particularly from the frame work 7 or 13. Near the end of the fully extended stroke of this previously retracted actuator, the other actuator, which is now retracted, is swung in beneath a ledge of a rack 15. As the lowering movement of the racks continue, this ledge will engage the beam 16 or 16' of this unit and the latter is then allowed to extend with throttled exhaust of the air from beneath its double acting piston. This action is repeated until such time as supports 3 have been lowered the required extent relative to platform 1.

During raising of supports 3 relative to platform 1, the reverse procedure takes place. The working medium, under pressure, is applied to the lower surfaces of the double acting pistons to move the latter upwardly, while their attached cross beams 16, 16' or 10 are engaged beneath a ledge of the associated rack 15, 11, or 11'. The cross beams 8, 14 or 14' again engage the ledges 18 of frame work 7 or 13, and thus supports 3 are drawn upwardly with alternating operation of the units 4, and with their lifting strokes overlapping so that a continuous upward movement of the supports 3 relative to platform 1 is effected. It should be noted, in this connection, that the vertical clearance between facing edges of adjacent steps of racks 11, 11' and 15 is less than the height of the cross beams 10, 16 and 16'.

While specific embodiments of the invention have been shown and described in detail to illustrate the application of the invention principles, it will be understood that the invention may be embodied otherwise without departing from such principles.

What is claimed is:

1. Apparatus for effecting relative vertical displacement of a movable working platform and vertically oriented supports therefor, said apparatus comprising, in combination, rack means extending along said supports; jacking means operatively connected with said platform for oscillation relative thereto for selective swinging into and out of operative engagement with said rack means; said jacking means comprising two hydraulic actuator sets offset from each other with respect to said rack means; each hydraulic actuator of a set comprising a cylinder connected at one end to said platform and a double acting piston connected to a piston rod extending from the other end of said cylinder and connected to a cross member engageable with teeth of said rack means; means operable, when one hydraulic actuator set is in operative engagement with said rack means and performing a displacing operation, to oscillate the other hydraulic actuator set into operative engagement with said rack means, in advance of completion of the displacement operation of said one hydraulic actuator set, to effect a displacing operation in overlapping and continuing relation with the displacing operation effected by said one hydraulic actuator set; each hydraulic actuator set comprising four hydraulic actuators arranged in two pairs, the two pairs of each set operating in synchronism with each other and being arranged on laterally opposed sides of said supports; a first cross member associated with each pair of actuators and interconnecting the outer ends of the piston rods thereof; a second cross member associated with each pair of actuators and extending transversely thereof to interconnect the lower ends of the cylinders of the pair of actuators; frame components secured to said platform; the upper end of the respective cylinders of said actuators having oscillating bearing engagement with downwardly facing surfaces of said frame components; and means operable between said frame components and said actuators and resiliently biasing the upper ends of said actuators into bearing engagement with said downwardly facing surfaces of said frame components.

2. Apparatus for effecting relative vertical displacement of a movable working platform and vertically oriented supports therefor, as claimed in claim 1, in which the upper ends of said cylinders are connected to said platform and said piston rods extend downwardly from said cylinders, said piston rods, when said cross members are in operative engagement, with the teeth of said rack means, having a substantially vertical orientation substantially parallel to the vertical extent of said supports.

3. Apparatus for effecting relative vertical displacement of a movable working platform and vertically oriented supports therefor, as claimed in claim 1, in which each set is sub-divided into pairs arranged in opposing relation at laterally opposite sides of said supports, the members of each pair operating in synchronism with each other.

4. Apparatus for effecting relative vertical displacement of a movable working platform and vertically oriented supports therefor, as claimed in claim 1, in which the clearance between adjacent teeth of said rack means is greater than the height of said cross members.

5. Apparatus for effecting relative vertical displacement of a movable working platform and vertically oriented supports therefor, as claimed in claim 1, in which said supports are of a tubular cross section and said pairs of actuators are disposed at 90° angular spacing horizontally around the associated support with respect to each other.

6. Apparatus for effecting vertical displacement of a movable working platform and vertically oriented supports therefor, as claimed in claim 1, in which the two sets of actuators are displaced vertically from each other relative to said rack means.

7. Apparatus for effecting relative vertical displacement of a movable working platform and vertically oriented supports therefor, as claimed in claim 1, in which said biasing means comprises, for each pair of actuators, a rod pivotally connected at its upper end to one of said frame components at the center of oscillation of the associated pair of actuators with respect to said frame component; said rod extending downwardly through said second cross member; and a compression spring embracing said rod beneath said second cross member and having its upper end engaging the under surface of said second cross member and its lower end engaging an abutment on the lower end of said rod.

References Cited by the Examiner

UNITED STATES PATENTS

| 2,947,148 | 8/1960 | Young | 254—110 |
| 2,963,868 | 12/1960 | Armstrong | 254—105 |
| 3,056,585 | 10/1962 | Smulders | 254—110 |

WILLIAM FELDMAN, *Primary Examiner.*

OTHELL M. SIMPSON, *Examiner.*